United States Patent [19]

Kloppsteck

[11] 4,451,156

[45] May 29, 1984

[54] FRYING PAN LID

[75] Inventor: Gerd Kloppsteck, Arnsberg, Fed. Rep. of Germany

[73] Assignee: Heinrich Berndes GmbH, Arnsberg, Fed. Rep. of Germany

[21] Appl. No.: 309,856

[22] Filed: Oct. 8, 1981

[30] Foreign Application Priority Data

Oct. 17, 1980 [DE] Fed. Rep. of Germany ....... 8027696

[51] Int. Cl.³ .......................... G04B 47/00; G04F 3/00
[52] U.S. Cl. ......................................... 368/10; 368/98; 99/344
[58] Field of Search ........................... 368/10, 97–100; 99/342–344

[56] References Cited

U.S. PATENT DOCUMENTS 578,059  3/1897  Hallas .................................. 368/100
2,192,600  3/1940  Lurtz .................................... 99/344

Primary Examiner—Vit W. Miska
Attorney, Agent, or Firm—John C. Smith, Jr.

[57] ABSTRACT

A frying pan lid is provided on which a retaining knob is secured centrically. The retaining knob is formed as a housing accommodating a short-time bell. At the retaining knob there are provided an adjusting element for the operating time of the short-time bell and an indicating element.

7 Claims, 1 Drawing Figure

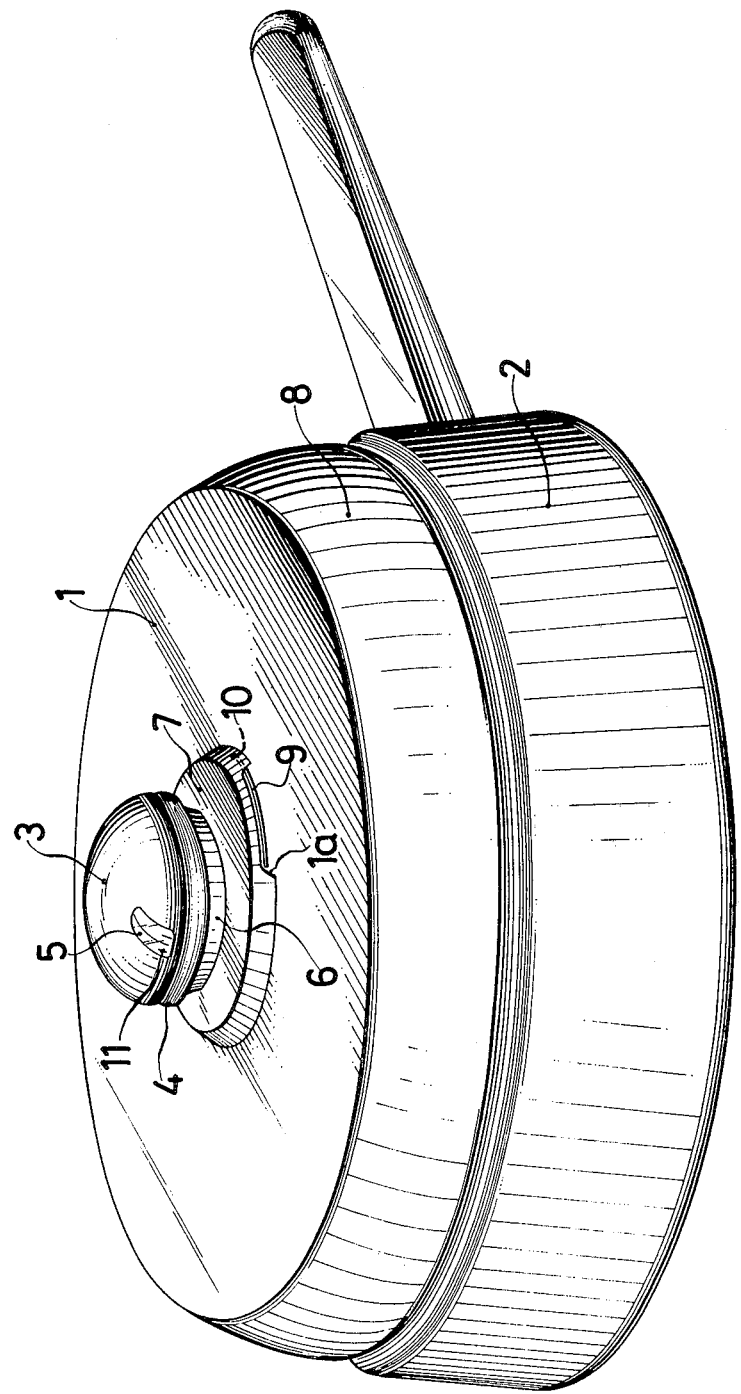

FRYING PAN LID

This invention relates to a frying pan lid.

SUMMARY OF THE INVENTION

It is an object of the invention to provide a frying pan lid which is equipped in an economical manner with means for acoustically indicating the time of frying.

To attain this object the present invention provides a frying pan lid which comprises a cover plate having a depending peripheral rim portion shaped to fit the top of a frying pan; a retaining knob secured centrically on top of the cover plate and formed as a housing; a short-time bell accommodated in said housing, and an adjusting element for the operating time of the short-time bell and an indicating element associated with the housing.

With such a frying pan lid, there thus is the possibility of setting the time by means of the retaining knob which is intended for frying, for instance any desired period of time within one hour. This invention is particularly economical because an element present anyhow, namely the retaining knob, is utilized as a housing for accommodating the short-time bell. It is self-evident that the invention may also be applied for stewing pans, grilling pans or for pots.

Preferably, the housing consists of an upper cup with an indicating window and a lower cup, the upper cup being connected to the lower cup rotatably and serving as adjusting element. In this particularly economic design, a commercially available short-time bell with an operating time of one hour may be accommodated in the housing which preferably has the form of an ellipsoid.

In the further development of the thought which underlies the invention the retaining knob may be based upon a base and the cover plate of the pan lid may be covered in the region of the base with a protection disk of heat-insulating material so that this region does not accept the same high temperatures as the pan lid does for safety reasons. This protection disk may also be formed rotatable with an adjustable venting slot.

BRIEF DESCRIPTION OF THE DRAWING

An embodiment of the invention will now be described by way of example and with reference to the accompanying drawing in which the only FIGURE is a perspective view of a frying pan and an associated frying pan lid according to the invention.

DESCRIPTION OF THE PREFERRED EMBODIMENT

On the horizontal cover plate 1 of the lid of a frying pan 2, a retaining knob is secured centrically. This retaining knob comprises an upper cup 3 and a lower cup 4. The two cups 3 and 4 serve as a housing for accommodating a short-time bell or alarm. The upper cup 3 is connected rotatably to the lower cup 4 and serves as an adjusting element for the short-time bell. At a window 5 in the upper cup 3 having a marking, the set time of the short-time bell may be read on a scale provided on the lower cup 4.

The retaining knob is placed upon a base 6 so that it may be gripped on all sides.

The region of the frying pan lid about the base 6 of the retaining knob is covered by a rotatable protection disk 7 of heat-insulating material so that it does not accept the high temperatures of the frying pan lid and protects against burns. By rotating the protection disk 7, a venting slot or recess 1a provided in the protection disk 7 may be adjusted as desired. To achieve this end, the horizontal cover plate 1 is also provided with a venting slot 9 into which an abutment 10 depending from the rotatable protection disk 7 extends. The venting slots 1a and 9 are similar in shape so that in one end position of the abutment 10 in the slot 9 of the horizontal cover plate 1 the interior of the frying pan 2 comunicates with the atmosphere, whereas in the other end position of the abutment 10 the interior of the frying pan 2 is completely shut off.

Short-time bells which may be used in connection with the invention are well known in the art and comprise a frame or plate and a winding mechanism. It is preferred to attach the frame or plate to the lower cup 4 and the winding mechanism to the upper cup 3 of the retaining knob.

A scale 11 may be provided at the lower cup 4 and a marking may be provided at the upper cup 3.

The horizontal cover plate 1 has a depending peripheral rim portion 8 shaped to fit the top of the frying pan 2.

The invention may be embodied in other specific forms without departing from the spirit or essential characteristics thereof. The embodiment is therefore to be considered in all respects as illustrative and not restrictive.

What is claimed is:

1. A frying pan lid comprising:
   (a) a cover plate having a depending peripheral rim portion shaped to fit the top of a frying pan;
   (b) a retaining knob secured centrically on top of said cover plate and formed as a housing; and
   (c) a short-time bell accommodated in said housing;
   (d) said housing comprising an upper cup and a lower cup, said lower cup including an indicating element and said upper cup including an indicating window and being rotatably connected to said lower cup.

2. A frying pan lid as claimed in claim 1, further comprising a base interposed between said retaining knob and said cover plate.

3. A frying pan lid as claimed in claim 2, further comprising a protection disc of heat-insulating material interposed between said base and said cover plate.

4. A frying pan lid as claimed in claim 3, further comprising a venting slot in said cover plate beneath said protection disc and a further venting slot in said protection disc, said protection disc being rotatably mounted on said cover plate whereby the size of the opening through said venting slots may be adjusted.

5. A frying pan lid as claimed in claim 1, wherein a scale is provided on the lower cup and a marking is provided at the upper cup.

6. A cooking pan lid comprising:
   (a) a cover member shaped to fit the top of a cooking pan;
   (b) a retaining knob secured on top of said cover member, said knob comprising a stationarily-mounted lower cup member and a rotatably-mounted upper cup member, one of said cup members having a scale and the other of said cup members having an indicating element arranged for registry with said scale;
   (c) a short-time alarm mounted in said retaining knob and adjustable by rotation of said upper cup; and
   (d) a protection disc rotatably mounted on said cover member between said lower cup member and said cover member, said protection disc having a venting slot therein and said cover plate having a further venting slot therein beneath said protection disc, the size of the opening through said venting slots being adjustable by rotation of said protection disc.

7. A cooking pan lid as claimed in claim 6 wherein said upper cup member includes a window, said indicating element being positioned on said upper cup member in said window and said scale being positioned on said lower cup member for viewing through said window.

* * * * *